July 29, 1969

JAMES E. WEBB
ADMINISTRATOR OF THE NATIONAL AERONAUTICS
AND SPACE ADMINISTRATION
POWER CONTROL CIRCUIT
Filed Feb. 14, 1966

INVENTOR.
BILL G. HERRON

BY
Howard B. Scheckman
ATTORNEYS

United States Patent Office 3,458,726
Patented July 29, 1969

3,458,726
POWER CONTROL CIRCUIT
James E. Webb, Administrator of the National Aeronautics and Space Administration, with respect to an invention of Bill G. Herron, Inglewood, Calif.
Filed Feb. 14, 1966, Ser. No. 528,031
Int. Cl. H03k *17/68*
U.S. Cl. 307—252
10 Claims

ABSTRACT OF THE DISCLOSURE

Power from an alternating current source is applied to a load by switching on two silicon control rectifiers in phase with the alternating current source. The circuit is arranged so that the switching circuit is isolated from other circuits or components and is controlled by relatively low voltage signals with a minimum of operating power being required.

---

The invention described herein was made in the performance of work under a NASA contract and is subject to the provisions of Section 305 of the National Aeronautics and Space Act of 1958, Public Law 85–568 (72 Statute 435; 42 U.S.C. 2457).

This invention relates to a solid state AC power switching circuit, and more particularly to a switching circuit utilizing semiconductor-controlled rectifiers that respond to low AC voltages in environments that involve high voltage isolation.

In many switching applications, reliability requirements make it desirable to effect switching with solid state devices. In many other types of switching applications, it is also desirable to provide voltage isolation of the switching circuit.

An example of one switching application, where both high reliability and voltage isolation are needed, would be in a spacecraft that uses ion engines to maintain itself in position. Present and future plans require reliable operation of a spacecraft's ion engines over many years duration. To position a spacecraft, it is necessary to start and stop the spacecraft's various ion engines many many times over this extended period.

A switching circuit must be used in one of the steps in starting and stopping an ion engine. The switching circuit functions to connect and disconnect the ion engine's ionizer heater (whose use will be more fully described later on) with the spacecraft's power supply. An ionizer heater uses high currents (20–30 amps), and it may be necessary to switch the ionizer heater on or off every four or five seconds over a period of years. Under these circumstances, any movable element used in the switching circuit, such as a relay with movable contacts, cannot provide the reliability of operation necessary for a spacecraft.

Another problem presented by the ionizer heater is that it is referenced to a high DC voltage (approximately 1500–6000 volts DC). It is therefore desirable to isolate the switching circuit from other circuits or components, that are at a lower potential, to avoid problems associated with high voltage, such as, for example, arcing.

Another problem peculiar to spacecraft, although not limited thereto, is that most voltages available for control functions are low voltages. It is therefore desirable that the switching circuit be capable of being operated by relatively low voltage signals, and also that little operating power be used in the switching circuit.

A switching circuit constructed in accordance with the principles of this invention, as discussed hereinafter, has very high reliability in that it eliminates the use of relays, can be used in places requiring high voltage isolation, can control large amounts of power, and can be operated by relatively low voltages while using little power to perform the switching.

The above is accomplished with a circuit that utilizes switches of the silicon-controlled rectifier (SCR) type in conjunction with signal transformers and low voltage level driving circuits. The SCR switches are mounted in back-to-back relation and are isolated from the spacecraft chassis.

A silicon-controlled rectifier, or SCR as it is commonly called, is a four-layer semiconductor device with an "all or nothing" characteristic. When forward-biased, it does not conduct until its breakover voltage is reached, unless it is triggered by a control signal applied to its gate electrode; afterwards, it conducts heavily and will continue to conduct until its anode-cathode voltage is dropped to a low value. When reverse-biased, the SCR blocks current flow until its Zener voltage is exceeded and junction breakdown occurs.

Signals are applied to the gates of the SCR switches through a signal transformer where voltage isolation is achieved. The primary coil of the signal transformer is driven by a transistor. Low level voltage signals to the base of the transistor can then connect the primary coil of the signal transformer through the secondary coil to the AC supply and, in turn, gate the SCR switches with the secondary coil so as to conduct on each half-cycle of the power wave form. One advantage in the use of SCR switches is that only very small currents in the order of milliamps are needed to gate the SCR switches.

The circuit uses solid state elements throughout and eliminates relays that might otherwise be required to perform this switching function.

SCR units are inherently high efficiency devices and are used here in their most reliable circuit configuration, that is, driven by AC power signals. It is noted that SCR units have presented problems in DC circuits owing to their thyratron-like action that requires removal of the operating voltage for reliable turn-off.

It is therefore an object of this invention to provide an AC solid state switching circuit tha can provide much more reliable operation than can a mechanically operated switching circuit.

It is also an object of this invention to provide an AC solid state switching circuit that can be used in place of relays.

It is also an object of this invention to provide an AC switching circuit that can be used in places requiring high voltage isolation.

It is another object of this invention to provide an AC solid state switching circuit that can be used for switching large amounts of AC power.

Another object of this invention is to provide an AC switching circuit that can be operated by relatively low voltages and that uses little power.

Other objects and advantages of this invention will become more apparent when considering the following detailed description, in conjunction with the accompanying drawings wherein.

Description

Figure 1:
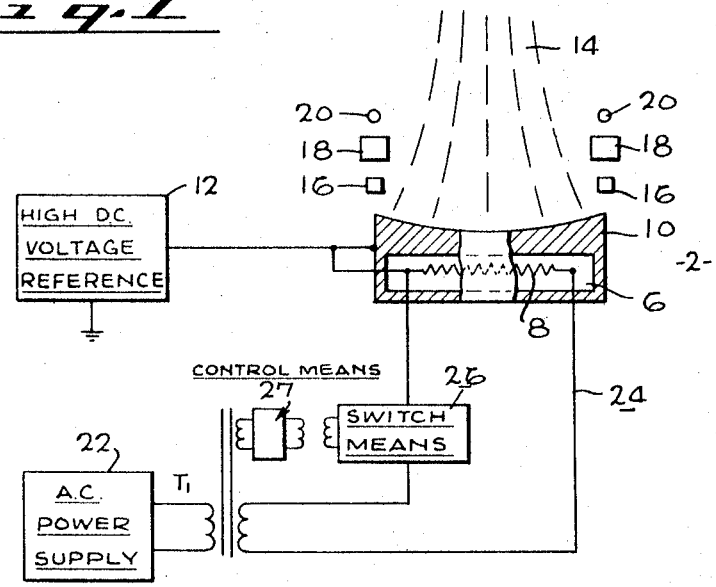
FIGURE 1 shows a portion of an ion engine utilizing the switching circuit.

Referring to FIGURE 1, the invention is shown broadly as it might be employed with respect to an ion engine, indicated generally by numeral 2. The ion engine is shown only schematically for purposes of illustrating an embodiment of the switching circuit of the invention (if a more detailed explanation of one type of ion engine is desired, reference is made to co-pending patent application of Robert L. Zimmerman, Ser. No. 477,333, filed Aug. 4, 1965.

An ion engine is essentially a device for accelerating a stream of ions and using them as a propulsion fluid. Referring to FIGURE 1, an expellant, such as, for example, cesium (not shown), is carried in a manifold 6 and is heated and liquified by ionizer heater 8. The expellant then passes through porous ionizer 10 where it is ionized. Ionizer 10 has a highly positive DC voltage 12 on it to repel the ions. The expellant issues as an ion stream 14 that is formed into a concentrated area by focus electrodes 16 that also have a highly positive voltage (not shown) on them. The ions are then accelerated by an accelerator electrode 18 that has a highly negative voltage on it (not shown). Finally, the ions are neutralized by electrode 20, so the ion stream will not be drawn to the spacecraft chassis (not shown).

To avoid problems, such as arcing, due to differences in potential between ionizer 10 and heater 8, the heater is also connected to positive DC voltage supply 12. Thus it will have the same voltage as the ionizer. This positive DC voltage on heater 8 may be in the order of 1500–6000 v. DC. This is the high DC reference voltage that was referred to previously. It will be noted, therefore, that heater 8 is part of a load circuit 24 that is exposed to high DC reference voltage 12. One of the functions of this invention is to switch heater 8 on and off while isolating this high reference voltage 12 from adjacent components and circuits so as to avoid arcing and the problems associated with handling high voltage.

Referring again to FIGURE 1, the switching circuit will first be broadly described to give an overall view of its operation. The switching circuit operates in general to connect and disconnect AC power supply 22 with load circuit 24 containing heater 8. Load circuit 24 includes switch means 26 that permits or prevents current flow through the load circuit. When switch means 26 is closed, AC power supply 22 is connected through transformer T1 to heater 8 and current flows through it. When switch means 26 is open, no current can flow through load circuit 24 and the heater will be off. It will be noted that AC power supply 22 is also connected to switch means 26 through a control means 27 that is transformer-coupled to switch means 26. This serves to isolate switch means 26 and to operate the switch means in phase with the AC wave form to permit current flow to heater 8 during a complete power cycle, as will be described below.

Figure 2:
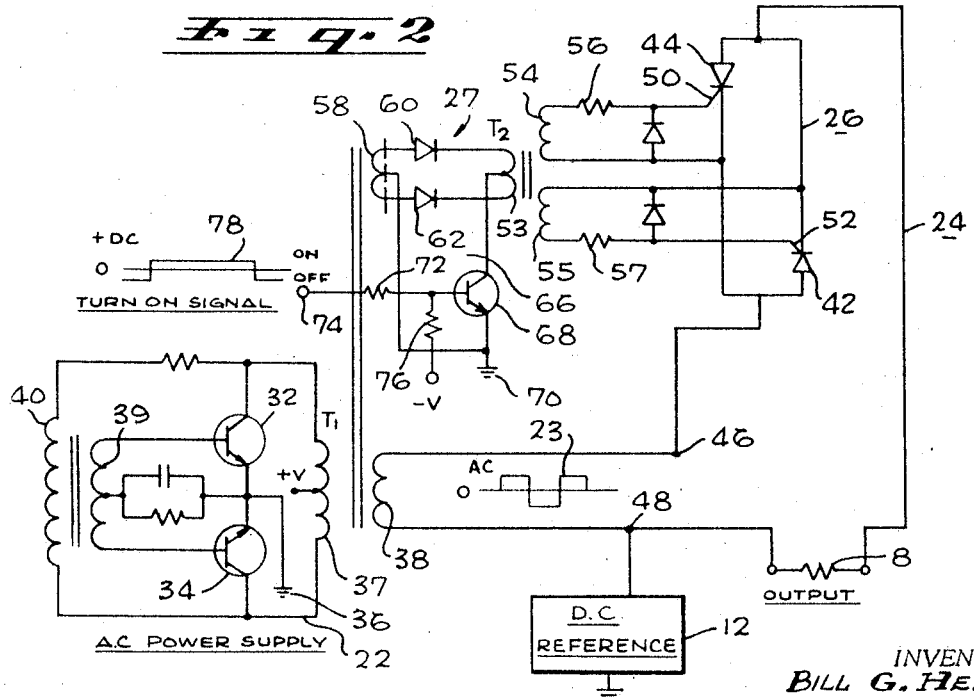
FIGURE 2 is a schematic diagram of the switching circuit.

Referring to FIGURE 2, the components of the switching circuit are shown in more detail. AC power supply 22 may be of any suitable well known construction capable of generating a square wave AC output signal 23. In the embodiment, the AC power supply is an oscillator that includes transistors 32, 34 whose emitters are connected to a common ground 36, and whose collectors are connected to the primary coil 37 of transformer T1. Coil 37 in turn drives secondary coil 33 in the load circuit 24. The center tap of coil 37 is connected to a positive voltage source (+v.). The base of each transistor is connected to a coil 39 inductively coupled to a feed back coil 40. The oscillator will function to generate an AC square wave, as first one transistor and then the other conducts, as is well known in the art. A square wave is used, so heater 8 will receive full power immediately.

Switching means 26 operates to permit or prevent current flow through load circuit 24. It includes silicon-controlled rectifiers (SCR) 42, 44 connected back-to-back in parallel relation. The anode of rectifier 42 and cathode of rectifier 44 are connected to terminal 46 of coil 38 while the anode of rectifier 44 and cathode of rectifier 42 are connected through heater 8 to the other terminal 48 of coil 38.

Signals are applied to gates 50, 52 of SCR's 42, 44 through gate means in the form of signal transformer $T_2$ where voltage isolation is achieved. Transformer $T_2$ has a primary coil 53, and two secondary coils 54, 55. Secondary coil 54 has one lead connected to SCR gate 50 through gate limiting resistor 56 and its other lead is connected to the cathode of SCR 44. Similarly, secondary coil 55 has one lead connected to SCR gate 52, through gate limiting resistor 57, and its other lead is connected to the cathode of SCR 42.

Control means 27 are provided to couple the output of AC power supply 22 to the gates of the SCR switches to operate the SCR switches in phase with the AC power supply wave form, so one of the switches will close and conduct on each half-cycle of the power wave form. Essentially, transformer primary coil T1 is provided with a second secondary coil 58 that is connected through diodes 60, 62 to the primary coil 53 of transformer $T_2$. Primary coil 53 is, in turn, coupled through its secondary coils 54, 55 to the gates of the SCR switches, as previously described.

Control means 27 also includes means 66 to permit or prevent the AC power supply from operating the SCR switches to control current flow to the heater. Means 66 includes NPN type transistor-amplifier 68 whose emitter is connected to a center tap in secondary coil 58 and to ground 70, and its collector is connected to a center tap in primary coil 53. Its base is connected through limiting resistor 72 to input terminal 74, and through bias resistor 76 to a negative voltage supply (−v.).

Amplifier 68 acts in cooperation with diodes 60 and 62 to control current flow through secondary coils 54, 55. Diodes 60 and 62 are positioned to prevent current flow through coils 53, 58 unless amplifier 68 provides a path for the current to by-pass one of the diodes.

When it is desired to turn heater 8 on, a control signal voltage 78 is applied to base terminal 74 by means (not shown) such as the spacecraft's guidance system, ground commands, or other signal devices well known in the art.

Transistor 68 receives positive and negative control signal voltages 78 on terminal 74, and these determine the amplifier's bias state. A negative control voltage on terminal 74 back-biases the amplifier; it is then essentially an open switch and does not conduct. When a positive control voltage is applied to terminal 74, it biases the transistor to a point wherein it conducts and permits the square wave input to be amplified.

The phasing between the SCR switches and AC power supply is such that a positive gate signal is present at the appropriate SCR switch gate when the anode of the SCR switch swings more positive than its cathode. When the gate is positive, with respect to the cathode of the SCR switch, at the same time the anode is positive relative to the cathode; the SCR switch is closed and will conduct.

Operation

As an explanation of the operation of the switching circuit, assume that a negative "off" signal 78 is applied to base terminal 74 of transistor 68. Assume also that AC power supply 22 is generating a voltage 23, and that it is being coupled through the secondary coil 38 of transformer T1 into load circuit 24. No current will flow through heater 8, however, because transistor 68 has a negative signal on its input terminal, and will be in a nonconduction state. There is therefore no path for current to bypass diode 60 or 62. Diodes 60, 62 will therefore prevent any current flow through coils 53 and 58. Both SCR switches 42, 44 will therefore remain open and no current can flow from transformer secondary coil 38 to heater 8.

Now assume that an "on" or positive voltage signal 78 is applied to base terminal 74 of transistor 68. Transistor 68 will conduct in response to the signal and provide a path for current to bypass diode 60, or 62, depending on the polarity of the wave form generated by AC power supply 22. Assume that the polarity of the wave form generated by AC power supply 22 is such that the top of the secondary coil 58 is presently positive. Electron current will be induced to flow from the center tap of coil 58 through the emitter and collector of transistor 68, through coil 53, diode 60, and back to the top of coil 58.

Current flowing through primary coil 53 of transformer T2 will induce current flow through secondary coils 54 and 55. This will induce a positive bias on SCR gate 52 and a negative bias on SCR gate 50 relative to their cathodes. Assuming that the top of secondary coil 38 of T1 is also positive, this will make the anode of SCR 42 more positive than its cathode and SCR switch 42 will close and conduct. When SCR switch 42 closes, it completes a circuit and current will flow in load circuit 24, from secondary coil 38 through heater 8, SCR switch 42, and back to secondary coil 38.

Now assume that an "on" signal is still applied to transistor 68, and that the AC power supply generates a voltage of opposite polarity to that originally generated. The top of coil 58 will be negative and electron current will flow through diode 62, and in the opposite direction in secondary coils 54, 55. This will induce a positive voltage on SCR gate 50 and a negative voltage on SCR gate 52. SCR switch 44 will close, while SCR switch 42 will be biased open. Current will flow in load circuit 24, from secondary coil 38, through SCR switch 44, through heater 8 and then back to the other side of secondary coil 38. Each SCR switch will therefore be closed for each half-cycle of the AC power wave form, to permit a complete cycle of AC current to flow through heater 8. Thus the switching circuit operates as an AC power-switching mechanism.

When it is desired to disconnect heater 8 from the AC power supply, all that is necessary is to apply a negative voltage on terminal 74 of transistor 68. This will bias the transistor to its nonconduction state, and remove the signal from the gates of the SCR switches so they both remain open.

With the disclosed switching circuit, only solid state components are employed, thus providing very reliable operation when compared to a switching circuit using movable elements. Also, with this switching circuit, the need for relays has been completely eliminated.

Also with the disclosed switching circuit, and referring to FIGURE 1, load circuit 24, including switch means 26, is completely isolated. Thus, the high voltage DC reference 12 is also completely isolated and is not a problem.

In addition, this switching circuit permits the use of relatively low voltages and low operating power to operate the circuit. The following is an example of some typical voltages that may be employed (these are to be taken as illustrative rather than limiting as other voltages are possible).

The AC power supply may generate a voltage in the order of 50 v. AC. The current needed to gate the SCR switches is in the milliamp range. The control signal voltage to turn transistor 68 "on" may be in the order of 5 v. DC. It is noted, while the above mentioned control signal voltage is quite small, the amount of power that this circuit can handle is limited only by the characteristics of available SCR units, and these are now available in ratings as high as 600 kilowatts.

While this AC switching circuit is illustrated as being used with the heater of an ion engine, it will be apparent to those skilled in the art that this switching circuit can be used on any type of a load, wherever a highly reliable, low voltage, low operating power, AC switching circuit is desired, and/or where high voltage isolation is required. It also can be used to control large amounts of power.

It is further noted, while the AC power supply generates a square wave, the type of AC wave generated would depend on the application of the switching circuit. It will be apparent that wave shapes, such as saw tooth, triangular or sine, can be used just as readily. It is also apparent that a PNP transistor can be substituted for the NPN transistor, as is well known in the art.

It is further noted that where voltage isolation is not a problem, the AC power supply can be connected into the load circuit 24, and transformer T1 eliminated. A phase keying line between the power supply and SCR switches can then be provided to provide for phase synchronization.

Although the present invention has been described and illustrated with respect to a specific embodiment, it will be appreciated that various modifications and variations may be made without departing from the spirit and scope of the invention. Thus it is not intended to limit the invention except by the terms of the following claims:

What is claimed is:

1. In an AC switching circuit for connecting an AC power supply to a load circuit, the combination comprising:
   (a) an AC power supply to supply power to said load circuit;
   (b) first solid state switch means operative when closed to permit current of one polarity to flow in said load circuit;
   (c) second solid state switch means operative when closed to permit current of the opposite polarity to flow in said load circuit;
   (d) means to close said switch means in phase with the polarity of said AC power supply; and
   (e) means to render said last-named means inoperative so it cannot close said first and second solid state switch means.

2. A device, as set forth in claim 1, wherein said first and second solid state switch means are SCR switches, and said means to close said switch means is operated by said AC power supply.

3. In an AC switching circuit for connecting an AC power supply to a load circuit, the combination comprising:
   (a) an AC power supply;
   (b) means to couple said AC power to said load circuit while isolating said AC power supply from said load circuit;
   (d) means isolated from said switch means and operative to close said switch means to permit current to flow through said load circuit during a complete AC power supply cycle; and
   (e) means to render said last-named means inoperative so it cannot close said switch means.

4. In an AC switching circuit for connecting an AC power supply to a load circuit, the combination comprising:
   (a) an AC power supply;
   (b) transformer means connecting said AC power supply to said load circuit to isolate said load circuit from said AC power supply;
   (c) first solid state switch means that operates when closed to complete a path for current of one polarity to flow through said load circuit;
   (d) second solid state switch means that operates when closed to complete a path for current of the opposite polarity to flow through said load circuit;

(e) means isolated from said switch means and operative to close each of said solid state switch means on different half-cycles of the power wave form to permit current to flow through said load circuit during a complete AC power supply cycle; and
(f) means to render said last-named means inoperative so it cannot close said first and second switch means.

5. In an AC switching circuit for connecting an AC power supply to a load circuit, the combination comprising:
(a) an AC power supply;
(b) a first SCR switch operative when closed to permit current of one polarity to flow in said load circuit;
(c) a second SCR switch operative when closed to permit current of the opposite polarity to flow in said load circuit;
(d) means to isolate said AC power supply from each of said SCR switches and operative to close said switches in phase with the AC power supply to connect said load circuit with said AC power supply during a complete power cycle; and
(e) means for rendering said last-named means inoperative so it cannot close said first and second SCR switches.

6. In an AC switching circuit for connecting an AC power supply to a load circuit, the combination comprising:
(a) an AC power supply;
(b) first transformer means connecting said AC power supply to said load circuit so as to isolate said load circuit from said AC power supply;
(c) a first SCR switch, operative when closed, to permit current of one polarity to flow through said load circuit;
(d) a second SCR switch, operative when closed, to permit current of the opposite polarity to flow through said load circuit;
(e) second transformer means coupled between said AC power supply and said SCR switches, to isolate said switches from said AC power supply, and operative to close said switches in phase with said AC power supply wave form; and
(f) means to render said second transformer means inoperative so it cannot close said SCR switches.

7. In an AC switching circuit for connecting an AC power supply to a load, the combination comprising:
(a) an AC power supply;
(b) a transformer connecting said AC power supply to said load to isolate said AC power supply from said load;
(c) a first SCR switch having its anode connected to a first side of said load, and its cathode connected to the other side of said load;
(d) a second SCR switch connected in parallel with said first SCR switch, and having its anode connected to said other side of said load and its cathode connected to said first side of said load;
(e) a second transformer having a primary coil coupled with said AC power supply, and having two secondary coils, one of said secondary coils being connected to the gate and cathode of one of said SCR switches so as to close said switch in response to signals of a first polarity; and the other secondary coils being connected to the gate and cathode of said other SCR switch so as to close said switch in response to signals of the opposite polarity; and
(f) means to render said second transformer's primary coils inoperative to close said SCR switches.

8. In an AC switching circuit for connecting an AC power supply to a load, the combination comprising:
(a) an AC power supply;
(b) a transformer connecting said AC power supply to said load circuit;
(c) a first SCR switch having its anode connected to a first side of said load, and its cathode connected to the other side of said load;
(d) a second SCR switch connected in parallel to said first SCR switch and having its anode connected to said other side of said load and its cathode connected to said first side of said load;
(e) gate means connected to the gates of SCR switches so as to close one of said SCR switches in response to signals of a first polarity, and to close the other SCR switch in response to signals of the opposite polarity;
(f) a transformer to couple signals from said AC power supply to said gate means so as to operate said SCR switches at the same frequency and relative phase relationship as said AC power supply and to isolate said gate means from said AC power supply; and
(g) means to render said last-named transformer inoperative so it cannot close said SCR switches.

9. In an AC switching circuit for connecting an AC power supply to a load, the combination comprising:
(a) an AC power supply;
(b) a transformer connecting said AC power supply to said load to isolate said AC power supply from said load;
(c) a first SCR switch having its anode connected to a first side of said load, and its cathode connected to the other side of said load;
(d) a second SCR switch connected in parallel to said first SCR switch and having its anode connected to said other side of said load and its cathode connected to said first side of said load;
(e) a first transformer coil connected to the gate and cathode of one of said SCR switches so as to close said switch in response to signals of a first polarity;
(f) a second transformer coil connected to the gate and cathode of said other SCR so as to close said switch in response to signals of the opposite polarity;
(g) means to isolate said AC power supply from said switches and operative to couple signals from said AC power supply to said first and second transformer coils so as to operate said SCR switches at the same frequency and relative phase relationship as said AC power supply; and
(h) means to render said last-named means inoperative to close said SCR switches.

10. In an AC switching circuit for connecting an AC power supply to a load, the combination comprising:
(a) an AC power supply;
(b) a first transformer having its primary coil connected to said AC power supply and its secondary coil connected in said load circuit;
(c) a first SCR switch having its anode connected to a first side of said load, and its cathode connected to the other side of said load;
(d) a second SCR switch connected in parallel with said first SCR switch and having its anode connected to said other side of said load and its cathode connected to said first side of said load;
(e) a second transformer having a primary coil and two secondary coils, one of said secondary coils being connected to the gate and cathode of one of said SCR switches so as to close said switch in response to signals of the opposite polarity;
(f) a second secondary coil connected to said first transformer and connected to couple signals from said AC power supply to the primary coil of said second transformer so as to operate said SCR switches at the same frequency and relative phase relationship as said power supply;
(g) a pair of blocking diodes positioned to prevent current flow in either direction from said second secondary coil of said first transformer, to the primary coil of said second transformer;

(h) a transistor having its emitter connected to the mid tap of said second secondary coil of said first transformer, and its collector connected to the mid tap of the primary coil of said second transformer; and
(i) an input terminal connected to the base of said transistor to receive signals to turn said transistor "on" to provide a bypass path around said blocking diodes to permit current to flow in said second transformer's primary coil to close said SCR switches on each half-cycle of the AC power supply wave form.

References Cited

UNITED STATES PATENTS

| | | |
|---|---|---|
| 3,058,010 | 10/1962 | Rockafellow. |
| 3,097,314 | 7/1963 | Harriman. |
| 3,089,965 | 5/1963 | Krezek. |
| 3,098,949 | 7/1963 | Goldberg. |
| 3,102,221 | 8/1963 | Harmer. |
| 3,120,634 | 2/1964 | Genuit. |
| 3,129,357 | 4/1964 | Ullmann et al. |
| 3,131,318 | 4/1964 | Snyder et al. |
| 3,275,883 | 9/1966 | Watters _____ 307—252 X |
| 3,290,486 | 12/1966 | Mordwinkin _____ 307—252 X |

DONALD D. FORRER, Primary Examiner

U.S. Cl. X.R.

307—305; 313—63; 315—251; 323—24